May 20, 1969  J. V. LEWALLEN  3,445,052
HINGED LAMINATE
Filed Aug. 22, 1966

INVENTOR
J. V. LEWALLEN
BY *Young & Quigg*
ATTORNEYS

United States Patent Office 3,445,052
Patented May 20, 1969

3,445,052
HINGED LAMINATE
John V. Lewallen, Bartlesville, Okla., assignor to Phillips Petroleum Company, a corporation of Delaware
Filed Aug. 22, 1966, Ser. No. 574,081
Int. Cl. B65d 5/00, 1/00, 13/00
U.S. Cl. 229—16                                    9 Claims

ABSTRACT OF THE DISCLOSURE

A structural laminate having an integral hinge formed in one layer thereof with the molecules in the region of the hinge orientated in a direction in the plane of said layer and perpendicular to the bend line of the hinge.

---

Figure 1:
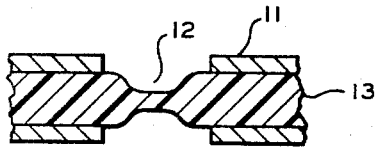

This invention relates to a laminate having an integral hinge. In one aspect it relates to a method for producing a laminate having an integral hinge. In another aspect it relates to a method for forming an integral hinge in a laminate having at least one layer which is either brittle or relatively nonflexible. In another aspect it relates to a method for making a collapsible article of a normally nonflexible laminate. In a more specific aspect it relates to a method for forming an integral hinge in a laminate having at least one metal layer. In an even more specific aspect it relates to a method for forming a collapsible article from a laminate of metal-clad polypropylene. In another aspect it relates to the articles formed by the above methods.

Various types of laminates have become widely used in recent years in various applications. The various layers of laminate can be chosen for strength, flexibility, lightness, chemical resistance, thermal insulation value, wear or scratch resistance or many other characteristics. By proper choice of the materials for use in the layers of the laminate, it is possible to form a laminate which is tailor made for a particular application. A laminate having, for example, a metal skin, a foamed polyethylene insulating layer, and a layer of a thermoplastic will be relatively lightweight, have good thermal insulating qualities, and have a skin which is resistant to bending, scratching or hard abrasive wear. Such a laminate could find use of a shipping container, a panel wall in a building, or any one of hundreds of other applications.

When an article is to be formed of such a laminate, corners are generally formed in the laminate by heating along the line on which a bend is desired in order to soften the thermoplastic layer. When the thermoplastic is softened, the laminate is bent and held in position until the thermoplastic rehardens in its bent position. The normal malleability of the metal layer of the laminate is relied upon to form the bend in this layer. Until my invention, however, it has not been possible to form a truly collapsible article from such a laminate. While it is known to form an integral hinge in certain thermoplastics, it has not previously been conceived that it would be possible to form such an integral hinge in a laminate comprised of other layers in addition to such a thermoplastic. If a metal-clad laminate were used for such an application, for example, the repeated flexing of the hinge which would be necessary in the normal use of any collapsible article would soon cause the metal to fatigue and break at the hinge line. Until my invention, therefore, there has been no method for forming an integral hinge in a laminate having a nonhinge-forming layer.

It is therefore an object of my invention to provide an integral hinge in a laminate. It is a further object of my invention to provide an integral hinge in a laminate comprised of at least one nonflexible layer. It is a further object of my invention to form an integral hinge in a laminate having at least one layer which is susceptible to fatigue upon repeated flexing. It is a further object of my invention to form an integral hinge in a metal-clad thermoplastic sheet. It is a further object of my invention to form a collapsible article from a laminate having at least one nonhinge-forming layer. It is a further object of my invention to form a collapsible carton of a laminate having a thermoplastic core and at least one skin layer of a metal. It is a specific object of my invention to form a collapsible carton of aluminum-clad polypropylene.

According to the invention, I form an integral hinge in a laminate comprising a hinge-forming layer and at least one nonhinge-forming layer by providing an interruption of the nonhinge-forming layer along the line on which the hinge is to be formed, and subsequently flexing the laminate along the said line to form an integral hinge by molecular orientation.

In one aspect of my invention, I form a hinge in a preformed laminate by cutting or stripping away a thin band of the nonhinge-forming layer along the line on which the hinge is to be formed. In another aspect, I form my laminate with interruptions of the nonhinge-forming layer at predetermined lines so that the resultant laminate can be directly folded into the desired article.

Other aspects, objects and the several advantages of this invention are apparent to one skilled in the art from a study of this disclosure, drawings, and the appended claims.

In a specific embodiment of my invention, I form a collapsible carton from a laminate having a polypropylene core and aluminum skin layers on both sides of the core by stripping away a thin band of the aluminum along the lines on which I desire to form integral hinges, and subsequently forming the hinges by known methods.

My invention is broadly applicable to any laminate which has one layer of a material which will form an integral hinge by molecular orientation during flexing, and at least one other layer which will not so form a hinge. Materials which form a hinge include nylon, and homopolymers and copolymers of ethylene, propylene and butene. Those materials which form particularly efficient integral hinges are polypropylene, high density polyethylene and ethylenebutene copolymers. The other layers of the laminate, which are preferably stripped away in the practice of my invention, can be any nonhinge-forming materials. My invention finds its greatest application with metal-clad laminates, preferably having skin layers of aluminum or steel. However, other materials can also be included, such as Mylar, acrylonitrile-butadiene-styrene copolymer, or virtually any other material. The skin layers on the two sides of the laminate may be the same or different materials. Multilayer laminates are included within the scope of my invention, including those which have at least one layer of a foam material, such a laminate being particularly suitable for thermal insulation.

As stated above, the laminate can either be formed with interruptions of the nonhinge-forming layer at the proper positions for future folding and forming of the hinges, or the nonhinge-forming layers can be stripped away from the hinge-forming layer in an already laminated sheet. The nonhinge-forming layer can be removed by scoring and tearing it away from the hinge-forming layer, or by milling it out with a grinder, or by etching it away with the appropriate solvent or etching agent.

Once the nonhinge-forming layers have been removed from the laminate, an integral hinge is formed in the hinge-forming layer by known methods. Such a hinge can be formed merely by flexing of the laminate, which flexing causes molecular orientation in the line of the flexing. It is preferred, however, to thin the hinge-forming layer along the hinge line. This generally is done by heating either the polymer or a bar or roller to just below the softening point of the polymer and either pressing or rolling to thin the hinge-forming layer. As a matter of hinge design, it is generally felt desirable that the hinge itself be from 10 to 15 mils thick, and the hinge width between 30 and 60 mils. The thickness will decrease slightly after the first flexing of the hinge due to "neck down" of the plastic. The exact design and configuration of the hinge, however, relates to design criteria already known in the art, and forms no part of this invention.

The hinge itself can alternately be formed by machining a groove in the hinge-forming layer with conventional wood or metal tools. Tool speed must be controlled so that excessive frictional heat is not generated in cutting the hinge.

When forming a laminate under pressure for the purpose of making an article of particular configuration, the nonhinge-forming layer is interrupted along the desired fold lines, as stated above. Additionally, the pressure plates for forming the laminates can be provided in the proper locations with dies which press the hinge into the hinge-forming material at the same time that the laminate is being produced. Such a process is desirable for the most economic operation, since the interruption of the non-hinge-forming layer and the formation of the thinned area along the hinge line are provided in a single operation.

It is already known that hinges formed in various thermoplastics by the methods described above have exceptional flex life characteristics. Polypropylene hinges formed by the method described above, for example, have withstood over a million flex cycles without failure. It is therefore seen that laminated collapsible containers made according to the process of my invention can have almost unlimited life. When such a container is formed of aluminum-clad polypropylene, the container is very nearly as strong and as rigid as aluminum itself, but has the advantage of being collapsible into a flat blank an almost unlimited number of times. Since the polypropylene integral hinges provide exceptional freedom from failure at the collapsible joints, and the aluminum facing provides strength and wear resistance, it is seen that a collapsible carton made with the laminate of my invention will far outlast any collapsible containers which have heretofore been manufactured.

The currently preferred embodiment of my invention is aluminum-clad polypropylene. A laminate housing somewhat less desirable strength properties, but greatly improved in thermal insulation is a laminate comprised of two aluminum skin layers, a layer of polyethylene or polypropylene foam disposed directly beneath the aluminum layers, and a core of polypropylene. Such a laminate makes an exceptional collapsible container for shipping refrigerated perishable goods such as vegetables, meat and poultry.

Figure 2:
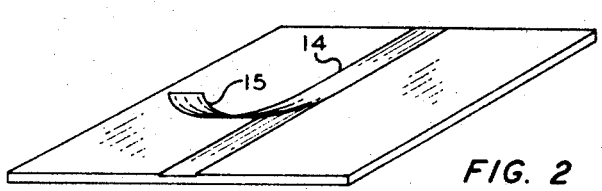
Figure 3:
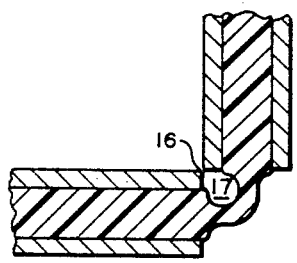
Figure 4:
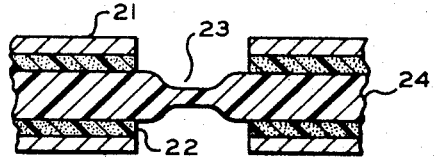
Figure 5:
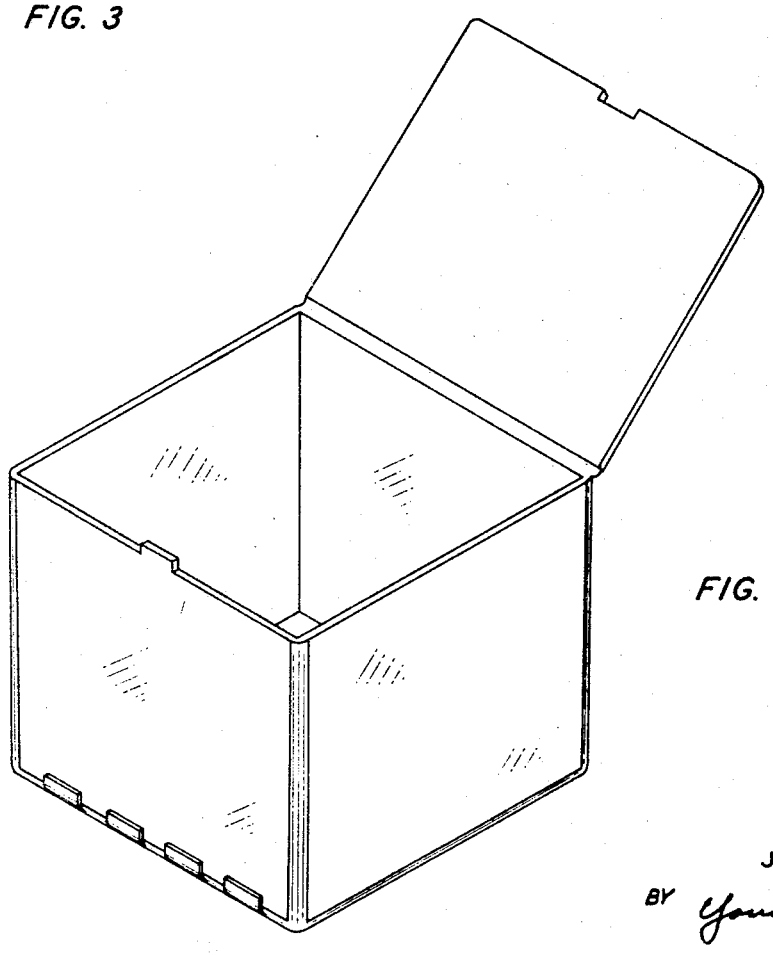

The operation of the process of my invention, and the articles made thereby can be seen by reference to the attached drawings. FIGURE 1 is a cross-section of a laminate of my invention. FIGURE 2 shows a method of removing a nonhinge-forming layer from a laminate. FIGURE 3 shows a corner joint formed at the hinge of my invention. FIGURE 4 shows a laminate containing a layer of thermoplastic foam and having an integral hinge. FIGURE 5 shows a collapsible container formed by my invention.

As seen in FIGURE 1, the nonhinge-forming layers 11 of the laminate are interrupted at gap 12. In the embodiment shown, the hinge-forming layer 13 is thinned to approximately 25% of its original thickness within the space of gap 12. When this laminate is flexed, molecular orientation will occur in the thin area, and the resultant integral hinge will withstand repeated flexing without breaking or tearing.

The first step in forming a hinge according to my invention in a preformed laminate is shown in FIGURE 2. The nonhinge-forming layers are scored along lines parallel to the desired hinge line as shown by score lines 14. The material between these score lines is then stripped away as at 15. Following removal of strip 15, the hinge is formed in the hinge-forming layer by known means as discussed above.

As shown in FIGURE 3, the dimensions of the gap formed in the nonhinge-forming layers of the laminate are chosen so that the edges of the laminate will meet at 16 upon subsequent folding of the laminate to a 90° angle. If desired a non-hardening mastic could be applied to joint 16 to prevent moisture or dirt from accumulating in the gap 17. Many non-hardening mastics are available on the commercial market which would be suitable for such sealing, and which would be easily strippable from the laminate when the carton was subsequently collapsed.

A laminate having a layer of foam insulation is shown in FIGURE 4. In this embodiment, both the skin layer 21 and the foam layer 22 are interrupted to form gap 23. Hinge-forming layer 24 is thinned within the gap as previously discussed.

FIGURE 5 shows an assembled carton made by the process of my invention. Integral hinges are provided at all corners. Although the carton could be assembled by means of external fastening devices, it is preferred that the carton be so designed that it interlocks with itself by means of tabs, slots, or other interlocking devices so that no external fasteners need be used. A carton design which is suitable for use with the laminate of this invention, and which requires no external fastening devices is disclosed in copending application Ser. No. 569,166 filed Aug. 1 1966.

I claim:
1. A structural thermally insulating laminate having an integral hinge, comprising:
   (a) a hinge-forming core layer of a thermoplastic material having an elongated reduced thickness hinge-forming region, the molecules of said region being oriented in the plane of the core layer and in a direction perpendicular to the intended bend line of the hinge,
   (b) a nonhinge-forming layer of foamed thermoplastic bonded to said core layer, said layer of foamed thermoplastic being interrupted over the entire hinge-foaming region, and
   (c) a nonhinge-forming wear-resistant skin layer bonded to the outer face of said foamed layer, said skin layer being likewise interrupted over the entire hinge-forming region.

2. An article according to claim 1 wherein the dimensions of the interruptions or gap formed between the non-hinge-forming layers of (b) and (c) are chosen so that the edges of the skin layer substantially meet upon subsequent folding of the laminate to a 90° angle.

3. An article according to claim 1 wherein the integral hinge is from 10 to 15 mils thick and the hinge width is between 30 and 60 mils.

4. An article according to claim 1 wherein (a) is a thermoplastic selected from nylon and homopolymers and copolymers of ethylene, propylene and butene, (b) is selected from polyethylene and polypropylene, and (c) is a metal.

5. An article according to claim 1 wherein (a) is selected from polypropylene, high density polyethylene and ethylene-butene copolymers, (b) is selected from polyethylene and polypropylene, and (c) is selected from aluminum and steel.

6. An article according to claim 1 wherein (a) is polypropylene, (b) is polyethylene or polypropylene, and (c) is aluminum.

7. An article according to claim 6 wherein there is a layer of foamed thermoplastic bonded to each face of said core layer and there is a nonhinge-forming wear-resistant skin layer bonded to the outer face of each of said foamed layers.

8. The laminate of claim 7 wherein said laminate has a plurality of integral hinges whereby said laminate is foldable to form an article.

9. The laminate of claim 8 wherein the article formed is a collapsible box.

References Cited

UNITED STATES PATENTS

| | | | |
|---|---|---|---|
| 3,145,904 | 8/1964 | Bromley | 229—3.5 X |
| 3,222,437 | 12/1965 | Schilling. | |
| 1,162,524 | 11/1915 | Staley et al. | |
| 1,865,159 | 6/1932 | Adamson | 217—2 X |
| 2,576,073 | 11/1951 | Kropa et al. | |
| 3,019,486 | 2/1962 | Stinson. | |
| 3,156,371 | 11/1964 | Harrison | 220—6 |
| 3,251,382 | 5/1966 | Tatsch | 220—9 |
| 3,330,437 | 7/1967 | Bellamy | 220—6 X |

JOSEPH R. LECLAIR, *Primary Examiner.*

JAMES R. GARRETT, *Assistant Examiner.*

U.S. Cl. X.R.

16—128; 220—9, 83; 229—3.5